(12) United States Patent
Kuntimaddi

(10) Patent No.: US 7,402,649 B2
(45) Date of Patent: Jul. 22, 2008

(54) COMPOSITIONS FOR USE IN GOLF BALLS

(75) Inventor: Manjari Kuntimaddi, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 364 days.

(21) Appl. No.: 11/243,851

(22) Filed: Oct. 5, 2005

(65) Prior Publication Data

US 2006/0030680 A1 Feb. 9, 2006

Related U.S. Application Data

(63) Continuation-in-part of application No. 11/162,538, filed on Sep. 14, 2005.

(51) Int. Cl.
*A63B 37/12* (2006.01)
*A63B 37/00* (2006.01)
*C08G 18/12* (2006.01)
*C08G 18/62* (2006.01)

(52) U.S. Cl. ............... 528/64; 528/61; 528/65; 525/123; 473/378

(58) Field of Classification Search ................ None
See application file for complete search history.

(56) References Cited

U.S. PATENT DOCUMENTS

| | | | |
|---|---|---|---|
| 3,937,474 A | 2/1976 | Jepson et al. |
| 3,979,126 A | 9/1976 | Dusbiber |
| 4,123,061 A | 10/1978 | Dusbiber |
| 5,962,619 A | 10/1999 | Seneker et al. |
| 5,965,681 A | 10/1999 | Schwindeman et al. |
| 6,190,268 B1 | 2/2001 | Dewanjee |
| 6,221,991 B1 | 4/2001 | Letchford et al. |
| 6,235,819 B1 | 5/2001 | Lawson et al. |
| 6,271,330 B1 | 8/2001 | Letchford et al. |
| 6,309,313 B1 | 10/2001 | Peter |
| 6,350,723 B1 | 2/2002 | Mishra et al. |
| 6,362,284 B1 | 3/2002 | Schwinderman et al. |
| 6,435,986 B1 | 8/2002 | Wu et al. |
| 6,486,261 B1 * | 11/2002 | Wu et al. .................. 525/332.6 |
| 6,530,849 B2 | 3/2003 | Peter |
| 6,582,326 B2 | 6/2003 | Wu et al. |
| 6,638,184 B2 | 10/2003 | Nesbitt et al. |
| 6,638,185 B2 | 10/2003 | Kennedy, III et al. |
| 6,645,091 B2 | 11/2003 | Wu et al. |
| 6,648,777 B2 | 11/2003 | Kennedy, III et al. |
| 6,699,027 B2 | 3/2004 | Murphy et al. |
| 6,699,957 B2 | 3/2004 | Gajewski et al. |
| 6,949,617 B2 | 9/2005 | Rajagopalan et al. |
| 2003/0114246 A1 | 6/2003 | Yokota |
| 2003/0203771 A1 | 10/2003 | Rosenberg et al. |
| 2004/0048689 A1 | 3/2004 | Nesbitt et al. |
| 2004/0077434 A1 | 4/2004 | Matroni et al. |
| 2004/0077435 A1 | 4/2004 | Matroni et al. |
| 2004/0132545 A1 | 7/2004 | Kennedy et al. |
| 2004/0220357 A1 * | 11/2004 | Wu et al. .................. 525/454 |
| 2004/0225102 A1 | 11/2004 | Rajagopalan et al. |
| 2005/0009640 A1 * | 1/2005 | Isogawa et al. ............. 473/371 |
| 2005/0054782 A1 * | 3/2005 | Rajagopalan ............... 525/314 |
| 2005/0054798 A1 | 3/2005 | Klang et al. |
| 2005/0124777 A1 | 6/2005 | Rosenberg et al. |

* cited by examiner

*Primary Examiner*—David Buttner
(74) *Attorney, Agent, or Firm*—Mandi B. Milbank

(57) ABSTRACT

A golf ball having a core and at least one layer disposed about the core is disclosed. The core may further include a center and an outer core layer disposed about the center. The layer is formed from a composition having a prepolymer and a curative, the prepolymer being formed from an isocyanate and a blend of two or more telechelic polyahls, wherein a first telechelic polyahl has a first functionality of 3 or greater, which is greater than a second functionality of a second telechelic polyahl in the blend. The layer displays an enhanced shear resistance.

18 Claims, No Drawings

COMPOSITIONS FOR USE IN GOLF BALLS

CROSS-REFERENCE TO RELATED APPLICATIONS

This application is a continuation-in-part of U.S. application Ser. No. 11/162,538, filed Sep. 14, 2005, now pending, the disclosure of which is incorporated herein by reference in its entirety.

U.S. Pat. No. 6,989,422, U.S. Pat. No. 7,214,738 and U.S. Pat. No. 7,098,274 are also incorporated herein by reference in their entirety.

FIELD AND BACKGROUND

The present disclosure is directed to compositions for use in golf ball that has superior resistance to water and moisture vapor in comparison to conventional materials, and golf balls formed from such compositions. One conventional material used to form golf ball covers is balata, a natural or synthetic trans-polyisoprene rubber. The softness of the balata cover allows the player to achieve spin rates sufficient to more precisely control ball direction and distance, particularly on shorter shots. However, balata covers lack the durability required by the average golfer, and are easily damaged. Accordingly, alternative cover compositions have been developed in an attempt to provide balls with spin rates and a feel approaching those of balata covered balls, while also providing a golf ball with a higher durability and overall distance.

Ionomer resins (e.g., copolymers of olefin, such as ethylene, and ethylenically unsaturated carboxylic acids, such as (meth)acrylic acids, wherein the acid groups are partially or fully neutralized by metal ions) have also been used as golf ball cover materials. Ionomer covers may be virtually cut-proof, but in comparison to balata covers, they display inferior spin and feel properties.

Polyurethanes and polyureas, by providing soft "feel," have also been recognized as useful materials for golf ball covers. However, conventional polyurethane covers do not match ionomer covers with respect to resilience or rebound. Unsaturated components (such as aromatic diisocyanate, aromatic polyol, and/or aromatic polyamine) used in a polyurethane or polyurea composition may at least in part attribute to the composition's susceptibility to discoloration and degradation upon exposure to thermal and actinic radiation, such as ultraviolet (UV) light. Conventional polyurethane covers can be prone to absorption of moisture, which is another mechanism through which desirable physical properties in the cover may be compromised. Moisture passed through the cover may further deteriorate physical and performance properties of the core.

Therefore, a continuing need remains for novel material compositions usable in forming golf ball portions (e.g., covers) having desirable and/or optimal combination of physical and performance characteristics, such as being hydrophobic and thus resistant to moisture absorption. Compositions such as those disclosed herein have superior and desirable hydrophobicity and resistance to moisture absorption, and may be suitable for forming one or more portions of the golf ball.

SUMMARY

This disclosure is directed to golf balls having a core and at least one layer (e.g., cover layer) disposed about the core. The core may have a diameter of 1.65 inches or less, a compression of 100 or less, and a CoR of 0.77 or greater. The layer may have a Shore D hardness of 25-70, a flexural modulus of 2,000 psi to 100,000 psi, and a thickness of 0.005 inches to 0.125 inches. The golf ball may have a CoR of 0.78 or greater, and a diameter of 1.68 inches or greater.

The layer, having an enhanced shear resistance, may be formed from a prepolymer and a curative, the prepolymer being formed from an isocyanate and a blend of two or more telechelic polyahls, wherein a first telechelic polyahl has a first polydispersity and a first functionality of 3 or greater, preferably 4 or greater, a second telechelic polyahl has a second polydispersity and a second functionality of 1.6 to 2.3, preferably 1.8 to 2.0. The prepolymer may have a % NCO of 6% to 15%. The first and second functionalities may independently be amine or hydroxyl functionalities, preferably both are hydroxyl functionalities. The first and second polydispersities may be both 1.35 or less. Preferably the first polydispersity is less than the second polydispersity. The first telechelic polyahl may comprise 10% or less by weight of the blend, preferably 5% or less. At least one of the first and second telechelic polyahls may be a telechelic polyhydrocarbon polyahl, preferably hydrogenated. The first telechelic polyahl may be a telechelic polyoxypropylene polyahl or a telechelic polyoxytetramethylene polyahl. The blend may comprise a third telechelic polyahl having a third functionality between the first and second functionalities, such as 2.4 to 2.9, and a third polydispersity preferably greater than the second polydispersity.

DETAILED DESCRIPTION

Broadly, the present disclosure is directed to golf balls and compositions used to form such golf balls. The golf balls may have a compression of 110 or less, a deflection at 100 kg force of 1.0 mm or greater, a coefficient of restitution ("CoR") of 0.79 or more, a moment of inertia ("MOI") of 87 or less, preferably 84 or less, an overall diameter of 1.68 inches or greater, and/or a dimple pattern having 250 to 450 dimples. Preferably, the golf balls display a low weight gain after being submerged in water at ambient temperature for 7 days, of 0.002 oz or less, more preferably 0.001 oz or less. The MOI is typically measured on model number MOI-005-104 Moment of Inertia Instrument manufactured by Inertia Dynamics of Collinsville, Conn. The instrument is plugged into a PC for communication via a COMM port and is driven by MOI Instrument Software version #1.2.

The golf ball may have a 2-piece construction of a core and a cover, or a 3-piece construction of a core having a center and an outer core layer, and a cover.

Optionally the golf ball has a coating layer disposed about the cover. The cover may be formed from a thermoplastic or thermoset material having urethane and/or urea linkages (e.g., polyurethane, polyurea), having a material hardness of 25-65 Shore D, a flexural modulus of 2,000 psi or greater, and/or a water vapor transmission rate ("WVTR") less than or equal to that of Surlyn®. The material may have a water vapor permeability, in unit of g·mm/(m²·day·mm Hg), of 0.05 or less, preferably 0.03 or less, more preferably 0.02 or less, further preferably 0.018 or less, further preferably 0.015 or less, further preferably 0.012 or less, further preferably 0.01 or less.

The core of the 2-piece balls may have a diameter of 1.64 inches or less, a compression of 100 or less, a deflection at 100 kg force of 1.5 mm or greater, a CoR of 0.78 or greater, a specific gravity of 1.4 g/cm³ or less, and/or a center hardness less than a surface hardness by 5 Shore C points or more. The core may be formed from a free radical initiator cured rubber composition comprising a rubber or a blend thereof having a Mooney viscosity of 30 or greater, a crosslinking agent at a level of 15 phr or greater by weight of the rubber, a rubber regrind, a filler, and/or optionally a CoR enhancer. Suitable rubbers, free radical initiators, crosslinking agents, and CoR enhancers include high cis polybutadiene rubbers, dicumyl peroxide, zinc diacrylate, and zinc pentachlorothiophenol, respectively, as well as any and all of those disclosed in the parent applications and in U.S. Application Nos. 11/173,282 and 60/689,901, the disclosures of which are incorporated by reference in their entirety.

The center of the 3-piece balls may have a diameter of 0.375 inches to 1.6 inches, a compression of 10 to 60, and/or a deflection at 100 kg force of 1.0 mm or greater. The center may be formed from free radical initiator cured rubber composition comprising a rubber or a blend thereof having a Mooney viscosity of 30 or greater, a crosslinking agent at a level of 10 phr to 40 phr, a rubber regrind, a filler, and/or optionally a CoR enhancer. The core having the center and the outer core layer of the 3-piece balls may have a diameter of 1.64 inches or less, a compression of 100 or less, a deflection at 100 kg force of 1.0 mm or greater, a CoR of 0.78 or greater, and/or a surface hardness of 60 Shore C or greater. The outer core layer may be formed from a free radical initiator cured rubber composition comprising a rubber or a blend thereof having a Mooney viscosity of 30 or greater, a crosslinking agent at a level of 25 phr to 55 phr, a rubber regrind, trans polyisoprene, a filler, and/or optionally a CoR enhancer.

Golf balls of the present disclosure comprise compositions formed at least in part from one or more telechelic polyahls having a hydrophobic polyhydrocarbon backbone. In one example, suitable telechelic polyahls have a polydispersity of 1.35 or less, preferably 1.3 or less (e.g., 1.26 to 1.23, or less), more preferably 1.2 or less, and most preferably 1.1 or less, with 1.0 being the theoretical minimum. In another example, the polyhydrocarbon backbone of the telechelic polyahl may be partially, substantially, or fully hydrogenated. In a further example, the telechelic polyahls may be liquid at ambient temperatures. In a further example, the telechelic polyahls may have a functionality (e.g., hydroxyl, primary or secondary amine) of 2.1 or less, preferably 2.0 or less, but 1.8 or greater, preferably 1.9 or greater. In a further example, the telechelic polyahls may have a functionality of 3 or greater, preferably 3.5 or greater, more preferably 4 or greater. In a further example, the telechelic polyahls may have a number average molecular weight of 2,000 or greater, preferably 3,000 or greater, but 5,000 or less.

In homotelechelic polyahls, the reactive end-groups may be hydroxyl groups (secondary, tertiary, preferably primary, or combination thereof) or amine groups (primary, preferably secondary, or combination thereof). In heterotelechelic polyahls, at least one of the reactive end-groups is amine or hydroxyl group (e.g., one being amine group and another being hydroxyl group). The telechelic polyahls may have an average hydroxyl or amine functionality of 1.6 or greater, preferably 1.8 or greater. The telechelic polyahls may further have additional hydroxyl and/or amine groups at the terminals, directly on the polymer backbone, on the branched side chains off the backbone, if any, and/or at the terminals of the branched side chains, if any. Any one or more of the secondary amine groups may in part form a single-ring or multi-ring heterocyclic structure. Preferred homotelechelic polyahls include α,ω-dihydroxy telechelics and α,ω-diamino telechelics; preferred heterotelechelic polyahls include α-amino-ω-hydroxy telechelics.

Amine or hydroxyl functionalities of suitable telechelic polyahls may be chosen specifically for certain chemical reactivity and/or physical properties. In one example, the telechelic polyahls may have a low amine or hydroxyl functionality of 1.6 or greater, preferably 1.8 or greater, more preferably 1.9 or greater, further preferably 2.3 or less, further preferably 2.15 or less, further preferably 2.0 or less. In another example, the telechelic polyahls may have a midrange amine or hydroxyl functionality of 2.4 or greater, preferably 2.9 or less, more preferably 2.6 or less. In a further example, the telechelic polyahls may have a high amine or hydroxyl functionality of 3 or greater, preferably 4 or greater, more preferably 10 or less, most preferably 6 or less. Telechelic polyahls having different amine or hydroxyl functionalities may be used singly or in combinations of two or more thereof. In one example, one, two, or more telechelic polyahls of low amine or hydroxyl functionalities may be used in a composition together with one, two, or more telechelic polyahls of mid and/or high amine or hydroxyl functionalities.

In one example, the compositions may further include at least one isocyanate (including any and all of those disclosed in the parent applications, preferably saturated, like bis(isocyanatocyclohexyl)-methane) and one or more additional reactants, and form thermoplastic, thermoset, castable, millable, or foamable (intumescent or swellable) reaction products that have urethane and/or urea linkages (e.g., polyurethanes, polyureas, poly(urethane-urea)s). In a further example, the one or more telechelic polyahls may form soft segments in the reaction products, such as by reacting with the at least one isocyanate to form a prepolymer, which is then chain-extended by one or more additional reactants (including any and all curatives disclosed in the parent applications, preferably saturated, like secondary polyamines such as 4,4'-bis(sec-butylamino)-dicyclohexylmethane) to form the reaction products. In a further example, the one or more telechelic polyahls may form hard segments in the reaction products, such as by reacting with an isocyanate-containing prepolymer to form the reaction products.

In one example, two or more telechelic polyahls of different amine and/or hydroxyl functionalities may in a blend react with the isocyanate to form the prepolymer. The telechelic polyahl of low amine and/or hydroxyl functionalities may constitute the majority (e.g., 50% or more by weight) of the blend, preferably 70% or more, more preferably 80% or more, further preferably 90% or more, further preferably 95% or more. The telechelic polyahl of mid or high amine and/or hydroxyl functionalities preferably constitutes a minority (e.g., 25% or less by weight) of the blend, preferably 10% or less, more preferably 5% or less, further preferably 3% or less, further preferably 1% or less. In another example, two or more telechelic polyahls of different amine and/or hydroxyl functionalities may in a blend react with an isocyanate-containing prepolymer to form the reaction products. In a further example, one or more telechelic polyahls of low amine and/or hydroxyl functionalities may react with the isocyanate to form the prepolymer. In a further example, one or more telechelic polyahls of mid and/or high amine and/or hydroxyl functionalities may be used to cure the prepolymer and form the reaction products.

Molecular weight of suitable telechelic polyahls is not particularly limiting. Typically, the telechelic polyahls may have a $M_n$ of 500 to 20,000, preferably 600 to 10,000, more preferably 800 to 5,000, further preferably 1,000 to 4,000, most preferably 1,500 to 3,500. One skilled in the art would understand that reaction products such as polyurethanes and polyureas may have a combination of soft segments and hard segments. Typically, soft segments are formed from telechelic polyahls that react with isocyanates to form isocyanate-containing prepolymers, and hard segments are formed from polyahls used as curatives that react with the prepolymers.

Preferably, the telechelic polyahls of the present disclosure form at least in part the soft segments of the resulting reaction product. The hard segments of the resulting reaction product may or may not contain the telechelic polyahls of the present disclosure.

The backbones of the telechelic polyahls may be homopolymeric, random copolymeric, block copolymeric (e.g., di-block, tri-block), grafted copolymeric, or terpolymeric. Non-limiting examples of polymeric backbones include polyhydrocarbons (e.g., polyolefins), polyethers, polyesters (e.g., polycaprolactones), polyamides (e.g., polycaprolactams), polycarbonates, polyacrylates (e.g., polyalkylacrylates), polysiloxanes, polyimines, polyimides, and copolymeric ones like polyolefinsiloxanes (e.g., $\alpha,\omega$-dihydroxy poly(butadiene-dimethylsiloxane) and $\alpha,\omega$-dihydroxy poly(isobutylene-dimethylsiloxane)), polyetherolefins (e.g., $\alpha,\omega$-dihydroxy poly(butadiene-oxyethylene)), polyetheresters, polyethercarbonates, polyetheramides, polyetheracrylates, polyethersiloxanes, polyesterolefins (e.g., $\alpha,\omega$-dihydroxy poly(butadiene-caprolactone) and $\alpha,\omega$-dihydroxy poly(isobutylene-caprolactone)), polyesteramides, polyestercarbonates, polyesteracrylates, polyestersiloxanes, polyamideolefins, polyamidecarbonates, polyamideacrylates, polyamidesiloxanes, polyamideimides, polycarbonateolefins, polycarbonateacrylates, polycarbonatesiloxanes, polyacrylateolefins (such as $\alpha,\omega$-dihydroxy poly(butadiene-methyl methacrylate), $\alpha,\omega$-dihydroxy poly(isobutylene-t-butyl methacrylate), and $\alpha,\omega$-dihydroxy poly(methyl methacrylate-butadiene-methyl methacrylate)), polyacrylatesiloxanes, polyetheresteramides, any other copolymers, as well as blends one two or more of these polymers. Other telechelic polyahls can be derived from telechelic polyacids through reaction with polyols, aminoalcohols, cyclic ethers, cyclic esters, and/or cyclic amides, or derived from aminotelechelic polymers through reaction with hydroxy acids, cyclic esters, cyclic amides, and/or cyclic ethers. Examples of these and other telechelics include those described in the parent applications and in co-pending application Ser. No. 10/996,670, the disclosures of which are incorporated herein by reference in their entirety.

The backbone of the telechelic polyahls may have one or more hydrophobic and/or hydrophilic segments. The weight percentage of hydrophobic segments in the backbone is preferably 50% or less, more preferably 25% or less, further preferably 10% or less, and most preferably 5% or less. In one example, the backbone of the telechelic polyahls is free of hydrophilic segments. Such hydrophobic backbones are typically present in telechelic polyhydrocarbon polyahls, which may be formed from one, two, three, or more different monomers through radical polymerization, cationic polymerization, or preferably anionic polymerization. It is understood by one skilled in the art that different polymerization techniques typically result in different polymeric backbones having different microstructures (e.g., different distribution of 1,4-cis, 1,4-trans, and 1,2-vinyl contents). Even using the same polymerization technique, the microstructure of the resulting polymeric backbone may be different when the reaction conditions are altered, or different catalysts and/or reagents are used.

Monomers suitable for forming hydrophobic backbones of the telechelic polyahls include any and all monoenic and polyenic hydrocarbons (i.e., hydrocarbons having one, two, or more ethylenic unsaturations, like monoenes, conjugated and nonconjugated polyenes). In one example, the monomers that form the hydrophobic backbone are free of molecules having two or more independently polymerized vinyl groups (e.g., nonconjugated polyenic hydrocarbons such as 1,3-divinylbenzene and 1,4-divinylbenzene). In another example, the monomers that form the hydrophobic backbone are free of aromatic structures. In a further example, the monomers that form the hydrophobic backbone consist essentially of one or more conjugated polyenes such as conjugated dienes and/or one or more alkylenes. Non-limiting examples of conjugated polyenes include 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene.

Polyhydrocarbon (e.g., poly(alkylene-diene), homopolydiene, copolydiene) backbones may be substantially unsaturated, which allow radical-initiated crosslinking through the ethylenic unsaturations in the presence of free radical initiators and optional crosslinking agents (e.g., those disclosed in the parent applications). These unsaturated polyhydrocarbon backbones may be partially or fully hydrogenated to improve their stability and weatherability of the resulting compositions. The degree of hydrogenation may be at least about 70%, preferably at least about 90%, more preferably at least about 95%, most preferably at least about 99%. Non-limiting examples of polyhydrocarbon backbones include polyolefins (e.g., polyethylenes, polypropylenes, polyethylenepropylenes, polyisobutylenes, polyethylenebutylenes (with butylene content of at least about 25% by weight, preferably at least about 50%), Kraton® rubbers), polydienes (e.g., polyisoprenes, polyisoprenes, polybutadienes), and poly(olefin-diene)s (e.g., poly(styrene-butadiene)s, poly(ethylene-butadiene)s, and poly(butadiene-styrene-butadiene)s).

In one example, the telechelic polyahls having polyhydrocarbon backbones may be substantially free of hydrolysable moieties (e.g., ether or ester linkages), and include telechelic polyahls having unsaturated homopolymers of conjugated dienes (e.g., 1,3-butadiene) as the backbones. The backbones may be branched, but preferably substantially linear. The homopolymer backbones have a 1,4-cis content of x, a 1,4-trans content of y, and a 1,2-vinyl content of z, where x+y+z=100%. The value of x may be 0% or greater, preferably 1% or greater, more preferably 3% or greater, even preferably 5% or greater, further preferably 10% or greater, further preferably 15% or greater, further preferably 20% or greater, further preferably 25% or greater, further preferably 40% or greater, further preferably 50% or greater, further preferably 60% or greater, further preferably 80% or greater, further preferably 90% or greater, further preferably 95% or greater, further preferably 98% or greater, further preferably 99% or greater. Alternatively, the value of x may be 100% or less, preferably 95% or less, more preferably 90% or less, even preferably 85% or less, further preferably 75% or less, further preferably 60% or less, further preferably 50% or less, further preferably 40% or less, further preferably 30% or less. The value of x may further preferably be in a range between two of the values disclosed above. The value of y may be 0% or greater, preferably 1% or greater, more preferably 3% or greater, even preferably 5% or greater, further preferably 10% or greater, further preferably 15% or greater, further preferably 20% or greater, further preferably 25% or greater, further preferably 40% or greater, further preferably 50% or greater, further preferably 60% or greater, further preferably 80% or greater, further preferably 90% or greater, further preferably 95% or greater, further preferably 98% or greater, further preferably 99% or greater. Alternatively, the value of y may be 100% or less, preferably 95% or less, more preferably 90% or less, even preferably 85% or less, further preferably 75% or less, further preferably 60% or less, further preferably 50% or less, further preferably 40% or less, further preferably 30% or less. The value of y may further preferably be in a range between two of the values disclosed above. The value of z may be 0% or greater, preferably 20% or greater, more preferably 30% or greater, even preferably 40% or greater, further preferably 50% or greater, further preferably 65% or greater, further preferably 70% or greater, further preferably 75% or greater, further preferably 80% or greater, further preferably 90% or greater. Alternatively, the value of z may be 100% or less, preferably 95% or less, more preferably 90% or less, even preferably 85% or less, further preferably 75% or less, further preferably 65% or less, further preferably 60% or less, further preferably 55% or less, further preferably 50% or less, further preferably 40% or less, further preferably 30% or less, further preferably 20% or less, further preferably 15% or less, further preferably 10% or less, further preferably 5% or less, further preferably 3% or less, further preferably 1% or less. The value of z may further preferably be in a range between two of the values disclosed above. Without being limited to any particular theory, it is believed that telechelic polydiene polyahls having higher 1,4-cis and/or 1,4-trans contents are better suited for use in golf balls. In one example, $x+y \geq 0.08$, preferably $x+y \geq 0.35$. In another example, $x+y \leq 0.77$, preferably $x+y \leq 0.35$.

The terminal isocyanate-reactive groups of the telechelic polydiene polyahls may be primary alkyl hydroxyl groups, primary allylic hydroxyl groups, secondary alkyl hydroxyl groups, primary alkyl amine groups, primary allylic amine groups, secondary alkyl amine groups, or combinations of two or more thereof. The telechelic polydiene polyahls may have a glass transition temperature of $-30°$ C. or less, preferably $-40°$ C. or less, more preferably $-50°$ C. or less, further preferably $-70°$ C. or less, most preferably $-75°$ C. or less. The telechelic polydiene polyahls may have a viscosity at room temperature of 1 Pa·s to 100 Pa·s. Suitable hydroxyl-terminated polydienes may have an OH value of 0.1 meq/g to 2 meq/g.

Also preferred telechelic polyhydrocarbon polyahls are partially or fully hydrogenated species of the telechelic polydiene polyahls described above. The degree of hydrogenation may be at least 40%, preferably 70% or greater, more preferably 80% or greater, further preferably 90% or greater, further preferably 95% or greater, further preferably 98% or greater, further preferably 99% or greater. In one example, substantially all of the 1,2-vinyl microstructures, if any, are preferably hydrogenated. Non-limiting examples include polyisoprene diols having 1,4-addition of at least 80%.

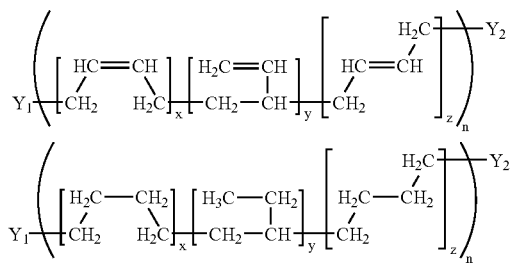

Preferred telechelic linear polybutadiene polyahls being unsaturated, partially hydrogenated, or fully hydrogenated may have the general structures illustrated above, where $Y_1$ and $Y_2$ are the same or different radicals each having one or more isocyanate-reactive groups (e.g., hydroxyl groups and/or amine groups), like —OH, —NH$_2$, or —NHR where R is $C_{1-20}$ radical; x, y, and z are numbers as described above; and n is the degree of polymerization, which is a number of 10 or greater, preferably 20 or greater, more preferably 25 or greater, further preferably 50 or greater, typically 500 or less, preferably 200 or less, more preferably 100 or less. At least one of the values of x and z may be greater than 0%, preferably both being greater than 0%, and the value of y may be 0% or greater. In one example, $6.5 \leq (x+z) \cdot n \leq 39.5$. In another example, $12 \leq y \cdot n \leq 72$. The telechelic polybutadiene polyahls (unhydrogenated, partially hydrogenated, or fully hydrogenated) may have any functionality as described above, but preferably have a low functionality of 1.8 to 2.3, more preferably be free of species with functionality higher than 2. Non-limiting examples include polybutadiene diols having 1,4-addition of 30% to 70%, preferably 40% to 60%. The polybutadiene diol can be more than about 99% hydrogenated, having a Mn of 3,300, a hydroxyl functionality of 1.92, and a 1,2-addition content of 54%.

In forming the compositions of the present disclosure, the telechelic polydiene polyahls may be used as a non-reactive component. That is, the composition is substantially free of ingredients that are capable of reacting with the telechelic polydiene polyahls, such as isocyanates. Alternatively, the telechelic polydiene polyahls may be used in a reactive, preferably liquid, composition where the telechelic polydiene polyahls react with one or more other ingredients by forming organic linkages (e.g., urethane, urea, ester, amide). In one example, the reactive composition comprises one, or a blend of two or more, of the telechelic polydiene polyahls, an isocyanate or a blend of two or more isocyanates, and optionally a curative (e.g., polyahls). The telechelic polydiene polyahls may form one or more hard segments of the resulting material (e.g., polyurethanes, polyureas) when the isocyanate is an isocyanate-containing prepolymer formed from a polyisocyanate and a polyahl. Preferably, the telechelic polydiene polyahls may form one or more soft segments of the resulting material by reacting with a polyisocyanate to form an isocyanate-containing prepolymer. Such prepolymers may have a low viscosity at room temperature of 200 Pa·s or less, preferably 120 Pa·s or less, more preferably 100 Pa·s or less, further preferably 50 Pa·s or less, further preferably 25 Pa·s or less, further preferably 5 Pa·s or less. Non-limiting ranges of viscosity include 0.5 Pa·s to 3 Pa·s, 0.7 Pa·s to 1.7 Pa·s, 12 Pa·s to 22 Pa·s, and 70 Pa·s to 95 Pa·s. Such prepolymers may have a % NCO of 15% or less (e.g., 10.9% to 12.1%), preferably 10% or less (e.g., 8% to 9.7%, 6% to 9%), more preferably 7.5% or less (e.g., 4% to 5%), but not less than 2% (e.g., 2.1% to 3.2%, 2.7% to 4.2%). Combination of low % NCO and low isocyanate functionality in the prepolymer (e.g., 2.5 or less) may render the prepolymer difficult to process. In such situations, plasticizers like soybean oil, dioctylphthalate, and other phthalates may be blended with the prepolymer to reduce viscosity.

The telechelic polydiene polyahls may be used singly or in blends of two or more thereof when forming the isocyanate-containing prepolymer. Preferably, one or more of the telechelic polydiene polyahls may be blended with one or more other telechelic polyahls (e.g., polyether polyahls, polyester polyahls) prior to reacting with the polyisocyanate. Suitable telechelic polyahls to blend with the telechelic polydiene polyahls are preferably compatible telechelic polyahls having a polarity no greater than that of polyoxyethylene polyahls. In such blends, the weight ratio of the telechelic polydiene polyahls to the compatible telechelic polyahls depends on the miscibility of the telechelic polyahls, and may be 10:1 or less (e.g., polyoxypropylene polyahls, particularly those having a $M_n$ of 2,000 to 3,000), preferably 5:1 or less, more preferably 4:1 or less (e.g., dimer diols and dimer diamines disclosed in the parent applications), even preferably 3:1 or less, further preferably 2:1 or less (e.g., polytetramethylene ether glycols, polyoxytetramethylene diamines), further preferably 1:1 or less.

Non-limiting examples of polyisocyanates (including diisocyanates) for use in the compositions of the present disclosure include those disclosed in the parent applications. In one example, saturated polyisocyanates (including aliphatic and cycloalipahtic polyisocyanates) are preferred for enhanced weatherability. In another example, aromatic polyisocyanates, particularly those that are free of non-aromatic unsaturations, are preferred for forming highly resilient materials (e.g., having a percentage of rebound of 60% or greater). To form thermoplastic materials, diisocyanates and uretdiones of diisocyanates are preferred choices. To form thermoset materials, higher polyisocyanates such as triisocyanates, tetraisocyanates, biurets and isocyanurates of diisocyanates are preferred.

Non-limiting examples of curatives, especially polyahls, for use in the compositions of the present disclosure include those disclosed in the parent application. In one example, short chain polyahls (liquid or solid at room temperature) that are compatible with the telechelic polydiene polyahls are preferred curatives, used singly or in blends of two or more thereof. Non-limiting examples include 2-ethyl-1,3-hexanediol, N,N-diisopropanolaniline, 2,2,4-trimethyl pentane-1,3-diol, 4,4'-methylenebis(3-chloro-2,6-diethyl)aniline, tetra(2-hydroxypropyl)ethylenediamine, polyoxypropylene polyahls having a $M_w$ of 500 or less, polyoxytetramethylene polyahls having a $M_w$ of 1,000 or less, dimer diols, dimer diamines, diols and polyols having at least one primary OH group that is one carbon atom away from a tertiary or quaternary carbon atom. When a curative that is incompatible with the telechelic polydiene polyahl is used, the incompatible curative may be used in an amount of 10 phr or less by weight of the telechelic polydiene polyahl (e.g., 6.5 phr or less for 1,4-butanediol). In another example, preferred curatives include polyfunctional (e.g., tri-functional, tetra-functional) polyols.

Additional curatives that are compatible with the telechelic polydiene polyahls include polyahls having a linear or branched polyhydrocarbon backbone. In one example, the curative polyahls have a hydroxyl or amine functionality of greater than 2, preferably 3 or greater, more preferably 4 or greater, and a $M_n$ of 5,000 or less, preferably 2,500 or less. In another example, the curative polyahls are the telechelic polydiene polyahls described above, and their derivatives having a higher hydroxyl or amine functionality of greater than 2, such as those derived by radical addition of 2-sulfanylethan-1-ol (initiated by 2,2'-azobis(isobutyronitrile)) to 1,2-vinyl moieties on the telechelic polydiene polyahls. Such derived high functionality telechelic polydiene polyahls may maintain a low polydispersity of 1.35 or less, preferably 1.3 or less, more preferably 1.26 or less.

The materials formed from the compositions comprising at least the telechelic polydiene polyahl, the polyisocyanate, and the optional curative may be used to form one or more portions (e.g., thin barrier layers, inner and/or outer cover layers) of the golf ball, utilizing some or all of the enhanced properties. At least some of these materials may have a low WVTR of 0.1 g·mm/(m²·day) or less, preferably 0.05 g·mm/(m²·day) or less, more preferably 0.036 g·mm/(m²·day) or less, further preferably 0.01 g·mm/(m²·day) or less. At least some of these materials may have a low glass transition temperature of −30° C. or less, preferably −35° C. or less, more preferably −40° C. or less, further preferably −45° C. or less, further preferably −50° C. or less, further preferably −70° C. or less. The materials may have 15 weight percent to 50 weight percent of hard segments by weight of the material. The material may have a percentage of rebound of 60% or greater, especially when filled with ground rubber (e.g., polybutadiene rubber) particles sized 5 microns to 1,000 microns. Other desirable properties include good abrasion resistance, low surface tension, good hydrolytic stability, good weatherability, and capability of oxidative crosslinking. When use as a barrier layer disposed between an outer cover layer and an inner core, or as a coating layer disposed about the outer cover layer, the composition may be formulated additionally with one or more vinyl monomers, one or more polyfunctional (meth)acrylates, and/or one or more vinyl functional urethane oligomer, and use free radical initiation and heat cure.

A variety of additives can optionally be incorporated into the compositions of the present disclosure, or any one or more of the subcomponents thereof. These additives include, but are not limited to, catalysts to alter the reaction rate, fillers to adjust density and/or modulus, processing aids or oils (such as reactive or non-reactive diluents) to affect rheological and/or mixing properties, reinforcing materials, impact modifiers, wetting agents, viscosity modifiers, release agents, internal and/or external plasticizers, compatibilizing agents, coupling agents, dispersing agents, crosslinking agents, defoaming agents, surfactants, lubricants, softening agents, coloring agents including pigments and dyes, optical brighteners, whitening agents, UV absorbers, hindered amine light stabilizers, blowing agents, foaming agents, and any other modifying agents known or available to one of ordinary skill in the art. One or more of these additives may be used in amounts sufficient to achieve their respective purposes and desired effects. Non-limiting examples of such additives and their appropriate amounts are disclosed in the parent applications.

Conventional materials used for golf ball covers, intermediate layers, and cores may be blended with the compositions of the present disclosure, by about 1 weight percent to about 95 weight percent of the composition. Non-limiting examples of such materials are disclosed in the parent applications. Preferably, a thermoplastic composition of the present disclosure is used, optionally in a blend with one or more conventional thermoplastic materials.

The golf ball cover layer or at least one sub-layer thereof (e.g., inner cover layer, outer cover layer) may preferably be formed from one of the compositions disclosed herein. The cover layer can have a thickness from 0.001 inches to 0.125 inches, preferably from 0.005 inches to 0.1 inches, more preferably from 0.01 inches to 0.05 inches, most preferably from 0.015 inches to 0.04 inches, like 0.035 inches. Alternatively, the thickness of the cover layer is 0.5 inches or less, preferably 0.05 inches to 0.2 inches, more preferably 0.05 inches to 0.1 inches. The cover layer may have a flexural modulus of 1,000 to 100,000 psi, preferably 1,000 psi to 80,000 psi, more preferably 1,000 to 50,000 psi, even preferably 1,000 psi to 30,000 psi, most preferably 2,000 psi to 25,000 psi, alternatively 10,000 psi to 80,000 psi. The Shore D hardness of the cover layer may be 90 or less, preferably 20 to 70, more preferably 20 to 60, further preferably from 25 to 55, even preferably from 30 to 55, most preferably from 40 to 55. The cover layer may preferably have a WVTR of about 2 g/(m²×day) or less, The core of the golf ball may be solid, fluid-filled, gel-filled, or gas-filled, having a single-piece construction or a multi-piece construction that includes a center and one or more outer core layers. Non-limiting examples of materials and compositions suitable for forming the core or one or more layers of the core are disclosed in the parent applications. Preferred compositions for solid cores include a base rubber (e.g., polybutadiene rubbers having a 1,4-cis content of at least about 40%), a crosslinking agent (e.g., ethylenically unsaturated acids having 3 to 8 carbon atoms and metal salts thereof), an initiator (e.g., peroxides, carbon-carbon initiators, and blends of two or more thereof) and, optionally, one or more additives (e.g., CoR enhancer like halogenated organosulfur compounds).

The golf ball core may have a diameter of 0.5 inches or greater, preferably 1 inch or greater, more preferably 1.5 inches or greater, further preferably 1.54 inches or greater, even preferably 1.545 inches or greater, most preferably 1.55 inches or greater, typically about 1.65 or less, or about 1.6 inches or less. The core may have an Atti compression of 20 to 120, preferably 30 to 100, more preferably 40 to 90, further preferably 45 to 85, further preferably 50 to 80, further preferably 50 to 75, even more preferably 50 to 65, most preferably 55 to 60; alternatively, the compression may be 25 or less, or 20 or less. The core may have a CoR of 0.7 or greater, preferably 0.75 or greater, more preferably 0.77 or greater, further preferably 0.79 or greater, even more preferably 0.8 or greater, and most preferably 0.81 or greater. The core may comprise a center and one or more outer core layers. The outer core layer may have a thickness of 0.5 inches or less, preferably 0.3 inches or less, more preferably 0.25 inches to 0.3 inches.

One, two, or more optional intermediate layers may be disposed between the core and the cover. The intermediate layer may be part of the core as an outer core layer, or part of the cover as an inner cover layer. In one example, an intermediate layer can be formed from a hard, high flexural modulus, resilient material which contributes to the low spin, distance characteristics when they are struck for long shots (e.g. driver or long irons). The material of the intermediate layer can have a Shore D hardness of 55-80, preferably 60-75, more preferably 65-72. The flexural modulus of the intermediate layer can be at least 50,000 psi, preferably from 55,000 psi to 120,000 psi, more preferably from 58,000 psi to 100,000 psi. The thickness of the inner cover layer may be from 0.020 inches to 0.050 inches, preferably from 0.030 inches to 0.040 inches. The intermediate layer preferably has a WVTR lower than that of the cover. More preferably, the WVTR of the intermediate layer is no greater than that of an ionomer resin such as Surlyn®, which is in the range of about 0.45 g/(m²× day) to about 0.95 g/(m²×day). Non-limiting examples of suitable materials and compositions that form the intermediate layers are disclosed in the parent applications.

The resultant golf balls typically have a CoR of about 0.7 or greater, preferably about 0.75 or greater, more preferably about 0.78 or greater, most preferably about 0.8 or greater. The golf balls also typically have an Atti compression of at least about 40, preferably from about 50 to 120, and more preferably from about 60 to 100. The golf balls typically have dimple coverage greater than about 60 percent, preferably greater than about 65 percent, and more preferably greater than about 75 percent. The diameter of the golf ball is preferably from 1.680 inches to 1.800 inches, more preferably from 1.680 inches to 1.760 inches, most preferably from 1.680 inches to 1.740 inches.

In one example, a golf ball cover layer is formed from a polyurethane elastomer, which is a reaction product of a prepolymer and a curative. The curative is 4,4'-bis(sec-butylamino)-dicyclohexylmethane. The prepolymer is formed from dicyclohexylmethane diisocyanate and a hydrogenated α,ω-dihydroxy polybutadiene having primary terminal hydroxyl groups, a polydispersity of 1.35, and a $M_n$ of 3,100. The cover layer has a material hardness of 47 Shore D and a moisture transmission of 0.0258 g/wk, in comparison with a conventional polyurethane cover layer having a moisture transmission of 0.3595 g/wk. The golf ball has a compression of 87. In another example, a golf ball having a polyurethane cover layer is formed using a composition disclosed herein. The prepolymer, having a % NCO of 8.5%, is formed from diphenylmethane diisocyanate and an α,ω-dihydroxy polybutadiene having a polydispersity of 1.35 or less. The curative is dimethylthiotoluene diamine. The cover layer has a moisture transmission of 0.054 g/wk, in comparison with a conventional polyurethane cover layer having a moisture transmission of 0.316 g/wk. In a further example, a golf ball having a polyurethane cover layer 0.04 inches thick disposed about a wound core of 1.6 inches in diameter is formed. The prepolymer, having a % NCO of 10.87%, is formed from dicyclohexylmethane diisocyanate and a hydrogenated polybutadiene polyol having a molecular weight of 3,000 to 4,000. The curative, used at an equivalent ratio of 1.02:1 to the prepolymer, is a hydrogenated polybutadiene polyol having a molecular weight of 3,000 to 4,000. The cover layer has a Shore D hardness of 33, a flexural modulus of 4,800 psi, and a moisture transmission of 0.0466 g/wk, in comparison to a conventional polyurethane cover having a moisture transmission of 0.3156 g/wk. The golf ball has a compression of 84, and a CoR of 0.778.

Golf balls of the present invention may have a variety of constructions, typically comprising at least a core and a cover. Optionally, one or more intermediate layers may be disposed between the core and the cover; the core may be a single solid mass, or include a solid, liquid-filled, gel-filled or gas-filled center and one or more outer core layers; and the cover may include an outer cover layer and one or more inner cover layers. Any of the outer core layers, the intermediate layers, or the inner cover layers may be a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gas-filled layer, or a foamed layer.

The compositions for golf ball portions as disclosed herein may be used in sporting equipment in general. Specifically, the compositions may be applied in various game balls, golf club shafts, golf club head inserts, golf shoe components, and the like.

As used herein, the terms "araliphatic," "aryl aliphatic," or "aromatic aliphatic" all refer to compounds that contain one or more aromatic moieties and one or more aliphatic moieties, where the reactable functional groups such as, without limitation, isocyanate groups, amine groups, and hydroxyl groups are directly linked to the aliphatic moieties and not directly bonded to the aromatic moieties. Illustrative examples of araliphatic compounds are o-, m-, and p-tetramethylxylene diisocyanate (TMXDI).

The subscript letters such as m, n, x, y, and z used herein within the generic structures are understood by one of ordinary skill in the art as the degree of polymerization (i.e., the number of consecutively repeating units). In the case of molecularly uniformed products, these numbers are commonly integers, if not zero. In the case of molecularly non-uniformed products, these numbers are averaged numbers not limited to integers, if not zero, and are understood to be the average degree of polymerization.

Any numeric references to amounts, unless otherwise specified, are "by weight." The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer.

As used herein, the term "polymer" refers to oligomers, adducts, homopolymers, random copolymers, pseudo-copolymers, statistical copolymers, alternating copolymers, periodic copolymer, bipolymers, terpolymers, quaterpolymers, other forms of copolymers, substituted derivatives thereof, and combinations of two or more thereof. These polymers can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric.

As used herein, the term "telechelic" refers to polymers having at least two terminal reactive end-groups and capable of entering into further polymerization through these reactive end-groups. Reactive end-groups disclosed herein include, without limitation, amine groups, hydroxyl groups, isocyanate groups, carboxylic acid groups, thiol groups, and combinations thereof.

As used herein, the term "polyahl" or "reactive polyahl" refers to any one compound or a mixture of compounds containing a plurality of active hydrogen moieties per molecule. Illustrative of such active hydrogen moieties are —OH (hydroxy group), —SH (thio group), —COOH (carboxylic acid group), and —NHR (amine group), with R being hydrogen, alkyl, aryl, or epoxy; all of which may be primary or secondary. These active hydrogen moieties are reactive to free isocyanate groups, forming urethane, urea, thiourea or corresponding linkage depending on the particular active hydrogen moiety being reacted. The polyahls may be monomers, homo-oligomers, co-oligomers, homopolymers, or copolymers, and include the compounds described in U.S. Pat. Nos. 4,394,491 and 4,822,827. Oligomeric and polymeric polyahls having at least one NCO-reactive group on each terminal of a backbone are typically employed as the soft segment in reaction products such as polyureas and polyurethanes. Depending on the terminal groups, the oligomeric and polymeric polyahls may be identified as polyols (with —OH terminals only), polyamines (with —NHR terminals only), or aminoalcohol oligomers or polymers (with both —OH and —NHR terminals). Such polyahls with a relatively low molecular weight (less than about 5,000), and a wide variety of monomeric polyahls, are commonly used as curing agents. The polyahls are generally liquids or solids meltable at relatively low temperatures.

As referred to herein, lower alkyls and lower alkoxies include $C_{1-5}$, preferably $C_{1-3}$, alkyls and alkoxies, such as methyl, ethyl, n-propyl, isopropyl, n-butyl, sec-butyl, t-butyl, amyl, isoamyl, methoxy, ethoxy, isopropoxy, isobutoxy, t-butoxy.

As referred to herein, halogens include fluorine, chlorine, bromine, and iodine.

As referred to herein, linear or branched alkyls include methyl, ethyl, n-propyl, isopropyl, n-butyl, sec-butyl, t-butyl, amyl, isoamyl, n-hexyl, 2-ethyl-n-hexyl, n-heptyl, n-octyl, isooctyl, n-nonyl, isononyl, n-dodecyl.

As referred to herein, substituted alkyls include cyanoalkyl, haloalkyl, hydroxyalkyl, alkoxyalkyl, preferably $C_{2-6}$, e.g., β-cyanoethyl, β-chloroethyl, β-hydroxyethyl, β-methoxyethyl, β-ethoxyethyl. Cycloalkyls include cyclopentyl, cycloheptyl, cyclohexyl, and may comprise one or more $C_{1-4}$ alkyls.

As referred to herein, aralkyls and alkaryls include methylbenzyl, phenethyl, phenisopropyl, benzyl, and may be ring-substituted, such as with halogen, methyl, and/or methoxy, like p-methylbenzyl, o- or p-chlorobenzyl, o- or p-tolyl, xylyl, o-, m- or p-chlorophenyl, and o- or p-methoxyphenyl.

As referred to herein, heterocyclic radicals include pyrrolidinyl, piperidinyl, pipecolinyl, morpholinyl, thiomorpholinyl, piperazinyl (e.g., N-methylpiperazinyl).

As used herein, the term "derivatives" refers to various compounds chemically derivable from the parent compounds, typically sharing one or more chemical properties and/or reactivities with the parent compounds. When applicable, the derivatives of the compounds disclosed herein include, without limitation, substitution derivatives having one or more substituents, anhydrides, dimers, oligomers, esters such as alkyl (e.g., methyl, ethyl, linear or branched $C_{1-12}$ alkyls), cycloalkyl, and aryl esters, amides, halides, oxides, sulfides, and salts having metal cations (e.g., Na, K, Zn, Ca, Co, Mg, Ni), organometallic cations, and non-metal cations (e.g., quaternary ammonium, quaternary pyridinium, quaternary quinolinium, (organo)phosphonium, (organo)sulfonium, (organo)oxonium, (organo)iodonium, (organo)azonium).

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

For molecular weights, whether $M_n$ or $M_w$, these quantities are determined by gel permeation chromatography using polystyrene as standards as is well known to those skilled in the art and such as is discussed in U.S. Pat. No. 4,739,019 at column 4, lines 2-45, which is incorporated herein by reference in its entirety.

As used herein, the terms "polydispersity" and "dispersity" refer to the ratio of $M_w$ to $M_n$, an indicator of the degree of molecular weight distribution of a polymer and the extent to which the polymer chains share the same degree of polymerization. Polydispersity has a theoretical minimum of 1.0.

As used herein, the terms "formed from" and "formed of" denote open, e.g., "comprising," claim language. As such, it is intended that a composition "formed from" or "formed of" a list of recited components be a composition comprising at least these recited components, and can further comprise other non-recited components during formulation of the composition.

As used herein, the term "cure" as used in connection with a composition, e.g., "a curable material," "a cured composition," shall mean that any crosslinkable components of the composition are at least partially crosslinked. In certain examples of the present disclosure, the degree of crosslinking can range from 5% to 100% of complete crosslinking. In other examples, the the degree of crosslinking can range from 35% to 85% of full crosslinking. In other examples, the the degree of crosslinking can range from 50% to 85% of full crosslinking. One skilled in the art will understand that the presence and degree of crosslinking can be determined by a variety of methods, such as dynamic mechanical thermal analysis (DMTA) in accordance with ASTM E1640-99.

As used herein, the term "saturated" or "substantially saturated" means that the compound or material of interest is fully saturated (i.e., contains no double bonds, triple bonds, or aromatic ring structures), or that the extent of unsaturation is negligible, e.g. as shown by a bromine number in accordance with ASTM E234-98 of less than 10, or less than 5.

As used herein, the term "percent NCO" or "% NCO" refers to the percent by weight of free, reactive, and unreacted or blocked (e.g., with phenols or ketoxime) isocyanate functional groups in an isocyanate-functional molecule or material. The total formula weight of all the NCO groups in the molecule or material, divided by its total molecular weight, and multiplied by 100, equals the percent NCO.

As used herein, the term "equivalent" is defined as the number of moles of a functional group in a given quantity of material, and calculated from material weight divided by equivalent weight, the later of which refers to molecular weight per functional group. For isocyanates the equivalent weight is (4210 grams)/% NCO; and for polyols, (56100 grams)/OH#.

As used herein, the term "flexural modulus" or "modulus" refers to the ratio of stress to strain within the elastic limit (measured in flexural mode) of a material, indicates the bending stiffness of the material, and is similar to tensile modulus. Flexural modulus, typically reported in Pa or psi, is derived in accordance to ASTM D6272-02.

As used herein, the terms "water vapor transmission rate" and "WVTR" refer to the mass of water vapor that diffuses into a material of a given thickness (e.g., 1 mm) per unit area (e.g., 1 m$^2$) per unit time (e.g., 24 h or day) at a specific temperature (e.g., 38° C.) and humidity differential (e.g., 90% relative humidity). Standard test methods for WVTR include ASTM E96-00, method E, ASTM D1653-85, and ASTM F1249-01.

As used herein, the term "material hardness" refers to indentation hardness of non-metallic materials in the form of a flat slab or button as measured with a durometer. The durometer has a spring-loaded indentor that applies an indentation load to the slab, thus sensing its hardness. The material hardness can indirectly reflect upon other material properties, such as tensile modulus, resilience, plasticity, compression resistance, and elasticity. Standard tests for material hardness include ASTM D2240-02b. Unless otherwise specified, material hardness reported herein is in Shore D. Material hardness is distinct from the hardness of a golf ball portion as measured directly on the golf ball (or other spherical surface). The difference in value is primarily due to the construction, size, thickness, and material composition of the golf ball components (i.e., center, core and/or layers) that underlie the portion of interest. One of ordinary skill in the art would understand that the material hardness and the hardness as measured on the ball are not correlated or convertible.

As used therein, the term "compression," also known as "Atti compression" or "PGA compression," refers to points derived from a Compression Tester (ATTI Engineering Company, Union City, N.J.), a scale well known in the art for determining relative compression of a spherical object. Atti compression is approximately related to Riehle compression: Atti compression≈(160−Riehle compression). Compression is a property of a material as measured on a golf ball construction (i.e., on-ball property), not a property of the material per se.

As used herein, the term "coefficient of restitution" or "CoR" for golf balls or subassemblies thereof is defined as the ratio of a ball's rebound velocity to its initial incoming velocity when the ball is fired out of an air cannon into a vertical, stationary, steel plate which provides an impact surface weighing about 100 pounds or about 45 kilograms. The time periods, $T_{in}$ and $T_{out}$, of the ball flight between two separate ballistic light screens placed between the air cannon and the plate are measured to calculate $CoR=T_{out}/T_{in}$. The faster a golf ball rebounds, the higher the CoR it has, the more the total energy it retains when struck with a club, and the longer the ball flies. The reported CoR's initial velocity is about 50 ft/s to about 200 ft/s, and is usually understood to be 125 ft/s, unless otherwise specified. A golf ball may have different CoR values at different initial velocities.

Another CoR measuring method uses a launching device, a circular titanium disk of 200 g and 4-inch in diameter to simulate a golf club, and two separate ballistic light screens placed there between. The impact face of the disk may also be flexible and has its own CoR. From the two time periods, disk mass ($M_e$), and ball mass ($M_b$), CoR can be calculated as follows:

$$CoR = \frac{(T_{out}/T_{in}) \times (M_e + M_b) + M_b}{M_e}$$

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

As used herein and to conventional practice, the unit "phr" refers to "parts by weight of a respective material per 100 parts by weight of the base polymer or polymer blend."

All patents and patent applications cited in the foregoing text are expressly incorporated herein by reference in their entirety.

The invention described and claimed herein is not to be limited in scope by the specific embodiments herein disclosed, since these embodiments are intended solely as illustrations of several aspects of the invention. Any equivalent embodiments and various modifications apparent to those skilled in the art are intended to be within the scope of this invention. It is further understood that the various features of the present invention can be used singly or in combination thereof. Such modifications and combinations are also intended to fall within the scope of the appended claims.

What is claimed is:

1. A golf ball, comprising:
   a core; and
   at least one layer disposed about the core, the layer comprising a composition formed from a prepolymer and a curative, the prepolymer being formed from an isocyanate and a blend of two or more telechelic polyahls, wherein a first telechelic polyahl has a first functionality of 3 or greater and a first polydispersity, a second telechelic polyahl has a second functionality of 1.6 to 2.3 and a second polydispersity, wherein at least one of the first and second telechelic polyahls is a telechelic polyhydrocarbon polyahl or a hydrogenated telechelic polyhydrocarbon polyahl, and wherein the layer displays an enhanced shear resistance.

2. The golf ball of claim 1, wherein the first and second functionalities are independently chosen from hydroxyl functionality and amine functionality.

3. The golf ball of claim 1, wherein the second functionality is 1.8 to 2.0.

4. The golf ball of claim 1, wherein the first functionality is 4 or greater.

5. The golf ball of claim 1, wherein the first and second functionalities are both hydroxyl functionalities.

6. The golf ball of claim 1, wherein the first telechelic polyahl comprises 10% or less by weight of the blend.

7. The golf ball of claim 1, wherein the first telechelic polyahl comprises 5% or less by weight of the blend.

8. The golf ball of claim 1, wherein the first polydispersity and the second polydispersity are both 1.35 or less.

9. The golf ball of claim 8, wherein the first polydispersity is less than the second polydispersity.

10. The golf ball of claim 1, wherein the blend further comprises a third telechelic polyahl having a third functionality and a third polydispersity.

11. The golf ball of claim 10, wherein the third functionality is less than the first functionality but greater than the second functionality.

12. The golf ball of claim 11, wherein third functionality is 2.4 to 2.9.

13. The golf ball of claim 10, wherein the third polydispersity is greater than the second polydispersity.

14. The golf ball of claim 1, wherein the prepolymer has a % NCO of 6% to 15%.

15. The golf ball of claim 1, wherein the core has a diameter of 1.65 inches or less, a compression of 100 or less, and a coefficient of restitution of 0.77 or greater.

16. The golf ball of claim 1, wherein the at least one layer has a Shore D hardness of 25 to 70 and a flexural modulus of 2,000 psi to 100,000 psi.

17. The golf ball of claim 1, wherein the at least one layer has a thickness of 0.005 inches to 0.125 inches.

18. A golf ball, comprising:
   a core; and
   at least one layer disposed about the core, the layer comprising a composition formed from a prepolymer and a curative, the prepolymer being formed from an isocyanate and a blend of two or more telechelic polyahls, wherein a first telechelic polyahl has a first functionality of 3 or greater and a first polydispersity, a second telechelic polyahi has a second functionality of 1.6 to 2.3 and a second polydispersity, wherein the second telechelic polyahl is a telechelic polyhydrocarbon polyahl, and the first telechelic polyahl is a telechelic polyoxypropylene polyahl or a telechelic polyoxytetramethylene polyahl, and wherein the layer displays an enhanced shear resistance.

* * * * *